United States Patent
Koyama et al.

(10) Patent No.: US 11,170,332 B2
(45) Date of Patent: Nov. 9, 2021

(54) DATA ANALYSIS SYSTEM AND APPARATUS FOR ANALYZING MANUFACTURING DEFECTS BASED ON KEY PERFORMANCE INDICATORS

(71) Applicant: Hitachi, Ltd., Tokyo (JP)

(72) Inventors: Hikaru Koyama, Tokyo (JP); Toshio Okochi, Tokyo (JP); Toshihiro Kujirai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 16/173,020

(22) Filed: Oct. 29, 2018

(65) Prior Publication Data
US 2019/0164101 A1    May 30, 2019

(30) Foreign Application Priority Data
Nov. 30, 2017  (JP) .............................. JP2017-230496

(51) Int. Cl.
*G06Q 10/06* (2012.01)
*G05B 19/418* (2006.01)
*G05B 23/02* (2006.01)

(52) U.S. Cl.
CPC ... *G06Q 10/06393* (2013.01); *G05B 19/4183* (2013.01); *G05B 23/0224* (2013.01); *G06Q 10/0637* (2013.01); *G06Q 10/06395* (2013.01)

(58) Field of Classification Search
CPC ....... G06Q 10/06393; G06Q 10/06395; G06Q 10/0637; G05B 19/4183; G05B 23/0224
See application file for complete search history.

(56) References Cited

U.S. PATENT DOCUMENTS

| 2004/0068431 | A1* | 4/2004 | Smith | G06Q 10/06375 705/7.14 |
| 2004/0220770 | A1* | 11/2004 | Isumi | G06T 7/0008 702/179 |
| 2006/0276994 | A1 | 12/2006 | Tsuda et al. | |
| 2009/0171879 | A1* | 7/2009 | Bullen | G06N 7/005 706/47 |

(Continued)

FOREIGN PATENT DOCUMENTS

| JP | 2000-91178 A | 3/2000 |
| JP | 2001-110867 A | 4/2001 |

(Continued)

OTHER PUBLICATIONS

Feature knowledge based fault detection of induction motors though the analysis of current data.; Ting Yang (Year: 2016).*

(Continued)

*Primary Examiner* — Timothy Padot
*Assistant Examiner* — Francis Z. Santiago Merced
(74) *Attorney, Agent, or Firm* — Crowell & Moring LLP

(57) ABSTRACT

A data analysis apparatus generates M (M is an integer of 3 or greater) groups each including data regarding a plurality of units from data where first KPIs and K (K is an integer of 2 or greater) explanatory variables are given by 1:1, generates a second KPI indicating the state of the group based on the values of a plurality of first KPIs included in the group, and selects a feature for the first KPIs based on a correlation analysis between the second KPI of each group and the feature of each group calculated based on the explanatory variables.

14 Claims, 10 Drawing Sheets

(56) References Cited

U.S. PATENT DOCUMENTS

| | | | |
|---|---|---|---|
| 2011/0000829 A1* | 1/2011 | Linde | G01R 31/31718 |
| | | | 209/571 |
| 2011/0071782 A1* | 3/2011 | Nahar | G01R 31/31718 |
| | | | 702/82 |
| 2011/0251812 A1* | 10/2011 | Gurov | H01L 22/14 |
| | | | 702/82 |
| 2012/0226476 A1* | 9/2012 | Shingaki | G05B 23/0254 |
| | | | 702/181 |
| 2015/0095119 A1* | 4/2015 | Hariharan | G06Q 10/06393 |
| | | | 705/7.39 |
| 2016/0148850 A1* | 5/2016 | David | G03F 7/70625 |
| | | | 438/5 |
| 2016/0154874 A1 | 6/2016 | Fukuda | |

FOREIGN PATENT DOCUMENTS

| | | |
|---|---|---|
| JP | 2003-114713 A | 4/2003 |
| JP | 2008-140307 A | 6/2008 |
| JP | 2009-258890 A | 11/2009 |
| JP | 2016-103126 A | 6/2016 |

OTHER PUBLICATIONS

Extended European Search Report issued in counterpart European Application No. 18202196.4 dated Dec. 21, 2018 (nine pages).
Japanese-language Office Action issued in Japanese Application No. 2017-230496 dated Mar. 16, 2021 with English translation (seven (7) pages).

* cited by examiner

*FIG. 6*

|  | CORRESPONDING | NOT CORRESPONDING |
|---|---|---|
| GOOD PRODUCTS | NA | NB |
| DEFECTIVE PRODUCTS | NC | ND |

FIG. 7

| UNIT ID | PASS/FAIL DETERMINATION RESULT |
|---|---|
| 1001 | True |
| 1002 | False |
| 1003 | True |
| 1004 | False |
| 1005 | True |
| 1006 | False |
| 1007 | True |
| 1008 | True |
| 1009 | True |
| 2001 | True |
| 2002 | True |
| 2003 | True |
| 2004 | False |
| 2005 | False |
| 2006 | False |
| 2007 | True |
| 2008 | False |
| 2009 | True |

FIG. 8

| UNIT ID | P1-1 (DEVICE A) | P1-2 (DEVICE A) | P2-1 (DEVICE B) | P2-2 (DEVICE B) | P3-1 (DEVICE C) | P3-2 (DEVICE C) |
|---|---|---|---|---|---|---|
| 1001 | 0.794 | 0.301 | 0.628 | 0.854 | 0.427 | 0.054 |
| 1002 | 0.232 | 0.580 | 0.164 | 0.324 | 0.405 | 0.383 |
| 1003 | 0.632 | 0.228 | 0.917 | 0.622 | 0.136 | 0.616 |
| 1004 | 0.196 | 0.457 | 0.529 | 0.307 | 0.008 | 0.437 |
| 1005 | 0.256 | 0.052 | 0.463 | 0.432 | 0.196 | 0.617 |
| 1006 | 0.675 | 0.398 | 0.583 | 0.972 | 0.223 | 0.322 |
| 1007 | 0.043 | 0.417 | 0.437 | 0.983 | 0.105 | 0.973 |
| 1008 | 0.518 | 0.679 | 0.462 | 0.849 | 0.970 | 0.4382 |
| 1009 | 0.736 | 0.172 | 0.036 | 0.830 | 0.982 | 0.481 |
| 2001 | 0.394 | 0.937 | 0.410 | 0.863 | 0.412 | 0.826 |
| 2002 | 0.652 | 0.366 | 0.478 | 0.660 | 0.045 | 0.512 |
| 2003 | 0.444 | 0.889 | 0.135 | 0.271 | 0.5942 | 0.212 |
| 2004 | 0.171 | 0.934 | 0.624 | 0.700 | 0.523 | 0.791 |
| 2005 | 0.174 | 0.802 | 0.076 | 0.849 | 0.250 | 0.657 |
| 2006 | 0.115 | 0.433 | 0.779 | 0.520 | 0.483 | 0.798 |
| 2007 | 0.617 | 0.254 | 0.557 | 0.736 | 0.146 | 0.587 |
| 2008 | 0.967 | 0.050 | 0.220 | 0.001 | 0.409 | 0.408 |
| 2009 | 0.673 | 0.954 | 0.009 | 0.973 | 0.844 | 0.684 |

FIG. 9A

| GROUP | UNIT ID | PASS/FAIL DETERMINATION RESULT | P1-1 (DEVICE A) | P1-2 (DEVICE A) | P2-1 (DEVICE B) | P2-2 (DEVICE B) | P3-1 (DEVICE C) | P3-2 (DEVICE C) |
|---|---|---|---|---|---|---|---|---|
| 1 | 1006 | False | 0.675 | 0.398 | 0.585 | 0.972 | 0.223 | 0.322 |
| 1 | 1007 | True | 0.043 | 0.417 | 0.437 | 0.985 | 0.105 | 0.973 |
| 1 | 1008 | True | 0.518 | 0.679 | 0.462 | 0.849 | 0.970 | 0.402 |
| 1 | 1009 | True | 0.736 | 0.173 | 0.036 | 0.830 | 0.082 | 0.481 |
| 1 | 2005 | False | 0.174 | 0.802 | 0.076 | 0.849 | 0.250 | 0.657 |
| 1 | 2006 | False | 0.115 | 0.433 | 0.779 | 0.520 | 0.483 | 0.798 |
| 1 | 2007 | True | 0.617 | 0.354 | 0.557 | 0.736 | 0.146 | 0.587 |
| 1 | 2008 | False | 0.967 | 0.050 | 0.220 | 0.601 | 0.409 | 0.408 |
| 1 | 2009 | True | 0.673 | 0.954 | 0.089 | 0.973 | 0.844 | 0.084 |

FIG. 9B

| GROUP | UNIT ID | PASS/FAIL DETERMINATION RESULT | P1-1 (DEVICE A) | P1-2 (DEVICE A) | P2-1 (DEVICE B) | P2-2 (DEVICE B) | P3-1 (DEVICE C) | P3-2 (DEVICE C) |
|---|---|---|---|---|---|---|---|---|
| 2 | 1001 | True | 0.794 | 0.301 | 0.628 | 0.854 | 0.427 | 0.054 |
| 2 | 1003 | True | 0.632 | 0.228 | 0.917 | 0.652 | 0.136 | 0.616 |
| 2 | 1005 | True | 0.256 | 0.053 | 0.403 | 0.432 | 0.196 | 0.617 |
| 2 | 2001 | True | 0.394 | 0.937 | 0.410 | 0.863 | 0.412 | 0.826 |
| 2 | 2002 | True | 0.652 | 0.366 | 0.478 | 0.680 | 0.045 | 0.512 |
| 2 | 2003 | True | 0.444 | 0.880 | 0.125 | 0.271 | 0.5042 | 0.212 |
| 2 | 1002 | False | 0.232 | 0.580 | 0.164 | 0.324 | 0.405 | 0.383 |
| 2 | 1004 | False | 0.196 | 0.457 | 0.529 | 0.307 | 0.008 | 0.437 |
| 2 | 2004 | False | 0.171 | 0.934 | 0.624 | 0.700 | 0.523 | 0.791 |

DATA ANALYSIS SYSTEM AND APPARATUS FOR ANALYZING MANUFACTURING DEFECTS BASED ON KEY PERFORMANCE INDICATORS

BACKGROUND OF THE INVENTION

1. Field of the Invention

The present invention relates to a data analysis system and a data analysis apparatus capable of analyzing a defect factor of a product based on a correlation analysis between a objective variable and an explanatory variable.

2. Description of Related Art

In a manufacturing line of a manufacturing industry, for example, during an assembly process of mechanical products, products are manufactured by assembling a large number of parts according to a design document. When a product can be assembled according to the design thereof, the product satisfying a desired performance is completely made.

Ideally, no defective product is generated even when a large number of products are manufactured, and good products are completely made at the rate of 100%. In reality, however, defective products are generated, and a defect rate, which is a ratio of defective products to good products, becomes an index for managing a manufacturing process. When the defect rate is high, unnecessary manufacturing costs incurs, thereby deteriorating profits in company management. For this reason, the defect rate is strictly managed daily and/or monthly.

In a manufacturing line, a testing process is performed to determine pass/fail of products, that is, whether products are good products or defective products. Good products are given a code of 1 or True and defective products are given a code of 0 or False. Further, a unit number (also referred to as a unit ID) is given to each product. In each process, unit numbers and manufacturing history data are recorded. Following the unit numbers, manufacturing history of product units can be tracked.

By organizing these data, pass/fail data and manufacturing history data of product units can be integrated into one line. In case of mass-produced products, the number of pairs of pass/fail data and manufacturing history data can be tens of thousands or even hundreds of thousands.

In an existing defect factor analysis, an analysis was performed by setting values of objective variable to pass/fail, that is, 1 or 0, and setting manufacturing history data to a group of explanatory variables. Logistic regression is generally used in a factor analysis of data in which the values of objective variables only include 1 and 0. By using logistic regression, an objective variable of 0, that is, an explanatory variable contributing a defect can be determined based on the magnitude of a regression coefficient. The logistic regression can provide a relative value of certain defect possibilities in percentile when an explanatory variable is considered to affect a defect increases or decreases.

However, a defect rate cannot be directly derived from data, such as what a defect rate (%) is fora particular range of values of an explanatory variable. Therefore, a method for finding and presenting a defect factor from data is being studied.

JP-A-2016-103126 discloses a technique for obtaining a condition of categorizing key performance indicators (hereinafter referred to as KPI) by dividing a plurality of pieces of workflow execution information into the number of groups corresponding to the number of types of the KPI, generating a graph for each of a plurality of groups from workflow execution information belonging to the corresponding group, calculating respective graph editing distances for two arbitrary graphs, generating a new group by merging two graphs having the smallest graph editing distance there between, calculating a graph editing distance for the new group, continuously generating new groups until the graph editing distance thereof becomes equal to or greater than a certain graph editing distance, and repeatedly calculating graph editing distances regarding the new groups.

JP-A-2009-258890 discloses a method of identifying an influential factor, the method capable of analyzing explanatory variables including a mixture of qualitative variables and categorical variables, not requiring a prerequisite that the correlation between objective variables and explanatory variables is linear, and not causing information loss. Specifically, the method includes a step of separating each data set of categorical variables among the explanatory variables into a plurality of segments according to the level of the qualitative variables among the explanatory variables, a step of obtaining a pseudo data set that can be handled as categorical variables in each of the segments and an empty space complementing the corresponding segment, and a step of identifying an influential factor that influences an objective variable by applying a multivariate analysis technique with respect to an explanatory variables of a group of pseudo data sets and the objective variable.

JP-A-2003-114713 discloses a method of attributing a factor of quality defect of a product to a process variable, the method capable of immediately determining which process variable is a factor of a process abnormality or quality defect even when a large number of process variables exist and process variables correlated with each other are included therein. Specifically, the method includes a step of searching for and collecting process data and calculating a residual variable and a distance variable with a principal component analysis, a step of calculating and comparing the degrees of contribution of the respective process variables to the residual variable and retrieving a process variable exhibiting a high degree of contribution as a candidate of the cause of the quality defect when the residual variable is out of an allowable range, a step of calculating and comparing the degrees of contribution of the respective score variables to the distance variable and retrieving a score variable exhibiting a high degree of contribution as a candidate of the cause of the quality defect when the distance variable is out of an allowable range, and a step of calculating and comparing the degrees of contribution of the respective process variables to the retrieved score variables and retrieving a process variable exhibiting a high degree of contribution to the retrieved score variables as a final candidate of the cause of the quality defect.

However, in the related art, an correlation analysis and a multivariate analysis are applied to KPIs or objective variables and explanatory variables in order to identify defect factors from data in manufacturing sites and factories of the manufacturing industry. In a multivariate analysis, objective variables represented as continuous values (for example, a dimensional accuracy) are subjected to a regression analysis using explanatory variables represented by continuous values. In other words, in order to increase or decrease a target index, it is analyzed which explanatory variable needs to be increased or decreased.

Meanwhile, an evaluation and an inspection of products manufactured at a manufacturing site and a factory are often represented by 1 or 0, like pass or fail (or good or defective). In other words, an objective variable is represented by a discrete value. Also, devices for manufacturing products are often controlled to operate within certain ranges in order to implement desired dimensions and characteristics. In other words, it is not common at a manufacturing site to perform a control with a certain explanatory variable becoming better at a highest value or a lowest value. Instead, it is often important whether an explanatory variable is within a controllable range.

In order to analyze pass/fail data or manufacturing history data obtained at a manufacturing site or a factory and identify a defect factor as described above, it was necessary to consider whether an explanatory variable is within a controllable range when an objective variable is represented by a discrete value of 1 or 0, and thus it was difficult to implement an existing multivariate analysis. Furthermore, it was difficult to analyze by what percentage a defect rate increases if an explanatory variable is out of a particular range of explanatory variables.

SUMMARY OF THE INVENTION

The present invention is made in consideration of the above circumstances, and is to provide a data analysis system and a data analysis apparatus capable of identifying a defect factor of a product based on objective variables expressed in binary values.

In order to achieve the above object, a data analysis system according to a first aspect of the present invention includes a data collecting device configured to collect manufacturing history data of units to which identification information is given and binary first key performance indicator (KPI) indicating whether the units are good products or defective products; and a data analysis apparatus configured to select a feature of explanatory variables related to a defect factor of the units from data to which the first KPIs and K (K is an integer of 2 or greater) explanatory variables are given by 1:1. The data analysis apparatus generates M (M is an integer of 3 or greater) groups each including data regarding a plurality of units from data to which the first KPIs and the K explanatory variables are given by 1:1, generates a second KPI indicating the states of the groups based on the values of a plurality of first KPIs included in the groups, and selects a feature for the first KPIs based on a correlation analysis between the second KPI of each group and a feature of each group calculated based on the explanatory variables.

According to the present invention, a defect factor of a product can be identified based on objective variables expressed in binary values.

BRIEF DESCRIPTION OF THE DRAWINGS

FIG. 6 is a diagram illustrating a 2×2 table divided based on whether parameters of manufacturing history data correspond to a feature or not and whether a corresponding product is a good product or a defective product;

FIG. 7 is a diagram illustrating a correspondence relationship between unit IDs and pass/fail determination results used in the data analysis method according to the first embodiment;

FIG. 8 is a diagram illustrating a correspondence relationship between unit IDs and manufacturing history data used in the data analysis method according to the first embodiment;

FIG. 9A is a diagram illustrating a correspondence relationship between the unit IDs of a group 1 and manufacturing history data used in the data analysis method according to the first embodiment, and FIG. 9B is a diagram illustrating a correspondence relationship between the unit IDs of a group 2 and manufacturing history data used in the data analysis method according to the first embodiment.

DESCRIPTION OF EMBODIMENTS

Embodiments will be described with reference to the drawings. The embodiments described below do not limit the invention according to the claims, and not all of the elements and combination thereof described in the embodiments are necessarily indispensable for solving means of the invention.

First Embodiment

Figure 1:
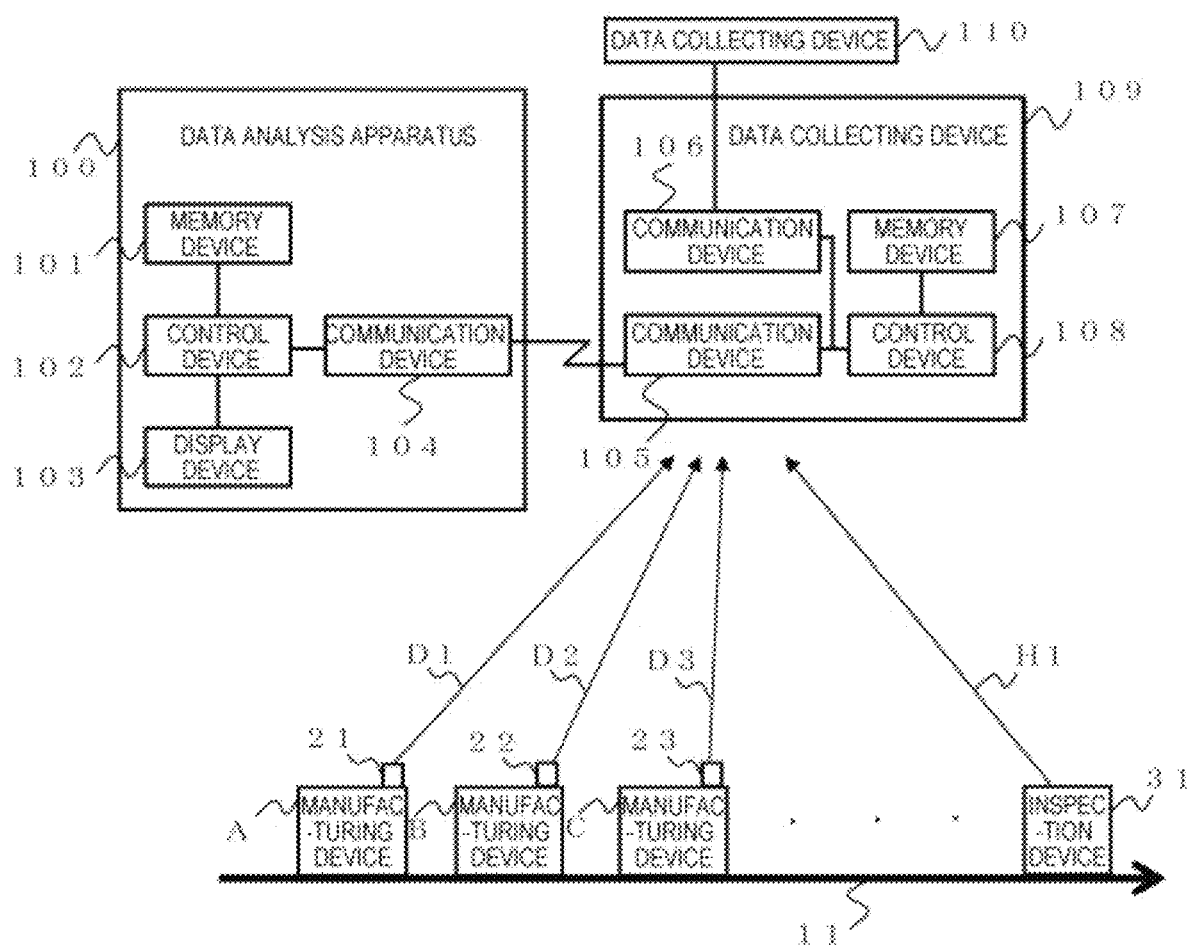
FIG. 1 is a block diagram illustrating the overall configuration of a data analysis system according to a first embodiment.

FIG. 1 is a block diagram illustrating the overall configuration of a data analysis system according to a first embodiment.

In FIG. 1, manufacturing devices A, B, and C and an inspection device 31 are installed in a manufacturing line 11. The manufacturing devices A, B, and C can perform assembly, processing, or treatment for completely making a product. A product manufactured in the manufacturing line 11 may be, for example, an automobile part such as a valve, or a main body of a car. The product may also be a part of a train, an aircraft, a ship, or the like, or may be an electric product such as a smart phone or a liquid crystal display.

The manufacturing devices A, B, and C are provided with sensors 21, 22, and 23, respectively. The sensors 21, 22, and 23 can detect respective operation states of the manufacturing devices A, B, and C and output results of the detections as the manufacturing history data D1 to D3. The manufacturing history data D1 to D3 may be, for example, flow rate data of gas or liquid used in manufacturing, position data at the time of positioning of a machine tool or the like, pressure data at the time of pressing, or temperature data during heating or cooling.

On the manufacturing line 11, the inspection device 31 is installed on the downstream side of the manufacturing devices A, B, and C. The inspection device inspects whether a product manufactured via the manufacturing devices A, B, and C is a good product or a defective product and outputs an inspection result as pass/fail data H1. The pass/fail data H1 is binary data given for each product. For example, the pass/fail data H1 can be set to 1 or True if the product is a good product, and can be set to 0 or False if the product is a defective product.

Here, each product can be assigned with a unit ID that identifies each product as an individual unit. The unit ID can be used, for example, to identify an individual product as an individual unit when products of a certain model are mass-produced. Then, when the manufacturing history data D1 to D3 and the pass/fail data H1 are transmitted, by transmitting the unit IDs together with the manufacturing history data D1 to D3 and the pass/fail data H1, it is possible to manage which units correspond to the manufacturing history data D1 to D3 and the pass/fail data H1.

In a data analysis system, a data analysis apparatus 100 and a data collecting device 109 are provided. The data analysis apparatus 100 includes a storage device 101, a control device 102, a display device 103, and a communication device 104. The data collecting device 109 includes communication devices 105 and 106, a storage device 107, and a control device 108. The communication device 106 is connected to another data collecting device 110.

The data collecting device 109 can collect first objective variables indicating the states of units having respectively assigned unit IDs thereto in binary values and K (K is an integer of 2 or greater) explanatory variables. Here, one first objective variable and one explanatory variable can be given to each unit ID by 1:1. At this time, one first objective variable can correspond to a plurality of explanatory variables by 1:1. The first objective variable can employ a first key performance indicator (KPI). The first KPI can employ the pass/fail data H1. An explanatory variable can employ manufacturing history data.

The communication device 105 communicates with the sensors 21, 22, and 23 and the inspection device 31 and communicates with the data analysis apparatus 100. The communication device 106 communicates with the other data collecting device 110. At this time, the data collecting device 109 may collect the manufacturing history data D1 to D3 and the pass/fail data H1 from the sensors 21, 22 and 23 and the inspection device 31, or from the other data collecting device 110.

The storage device 107 stores the manufacturing history data D1 to D3 and the pass/fail data H1. At this time, the storage device 107 can store the manufacturing history data D1 to D3 and the pass/fail data H1 in association with unit IDs. The control device 108 controls the communication devices 105 and 106 and the storage device 107 to perform a data collection process. Here, the manufacturing history data D1 to D3 and the pass/fail data H1 can be given to each unit ID by 1:1.

The data analysis apparatus 100 can select a feature of an explanatory variable related to a defect factor of a unit from data where the first objective variable and the explanatory variable are given by 1:1. In the example in FIG. 1, the first objective variable is pass/fail data H1 and the explanatory variables are the manufacturing history data D1 to D3, respectively. Here, the data analysis apparatus 100 can utilize a correlation analysis to select a feature of an explanatory variable related to a defect factor of a unit. In order to utilize a correlation analysis, a second objective variable can be generated from the first objective variable and the second objective variable and an explanatory variable can be given by 1:N (N is an integer of 2 or greater). The second objective variable can employ a second KPI. The second KPI can be set based on the pass/fail data H1 regarding a plurality of units.

In order to generate a second objective variable from a first objective variable, M (M is an integer of 3 or greater) groups including data regarding a plurality of units are generated from data where first objective variables indicating the states of units in binary values and K explanatory variables are given on the basis of 1:1. Next, based on the values of the first objective variables of the units included in each group, a second objective variable indicating the state of each group can be generated. Since each group includes data regarding a plurality of units, the number of the first objective variables can be equal to the number of units of each group. Therefore, by corresponding the state of each group to the second objective variable, the second objective variable can have N values according to the number of units of each group. Next, by performing a correlation analysis between the second objective variable of each group and a feature of each group calculated based on the explanatory variable, a feature corresponding to the first objective variable can be selected. Here, the feature is a value calculated for each group in relation to the explanatory variable.

The storage device 101 can store the manufacturing history data D1 to D3 and the pass/fail data H1 in correspondence to the unit ID. The control device 102 controls the storage device 101, the display device 103, and the communication device 104 to perform a data analysis process. The display device 103 displays a defect factor of a product manufactured in the manufacturing line 11. The communication device 104 communicates with the data collecting device 109.

Figure 2:
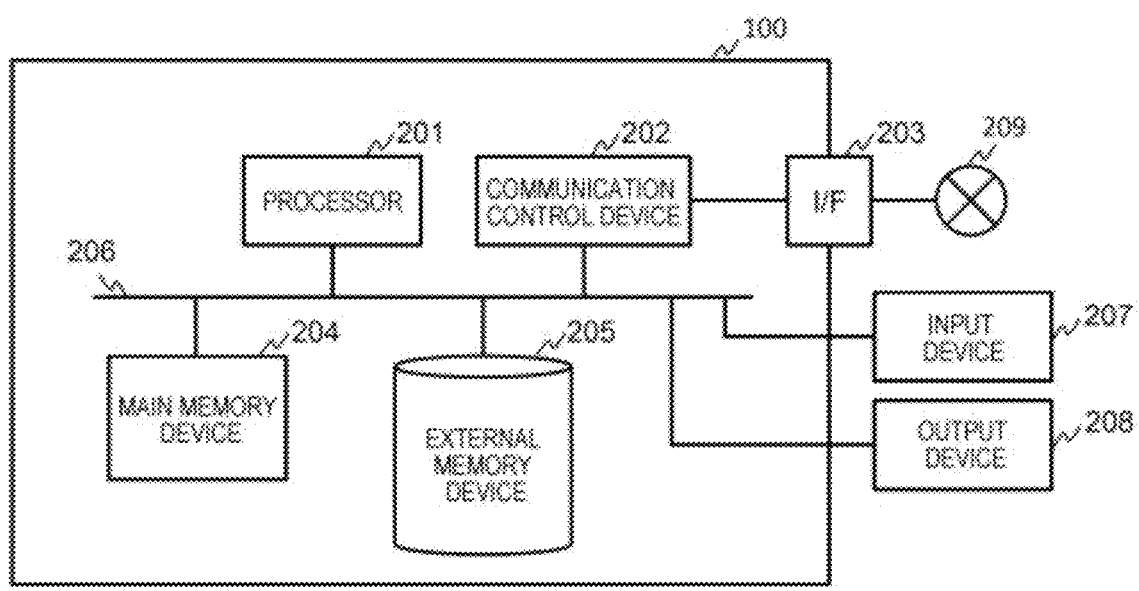
FIG. 2 is a block diagram illustrating an exemplary hardware configuration of the data analysis apparatus of FIG. 1.

FIG. 2 is a block diagram illustrating an exemplary hardware configuration of the data analysis apparatus of FIG. 1.

In FIG. 2, the data analysis apparatus 100 includes a processor 201, a communication control device 202, a communication interface 203, a main storage device 204 and an external storage device 205. The processor 201, the communication control device 202, the communication interface 203, the main storage device 204, and the external storage device 205 are mutually connected via an internal bus 206. The processor 201 can be provided in the control device 102 of FIG. 1.

An input device 207 and an output device 208 are provided as a human interface of the data analysis apparatus 100. The input device 207 and the output device 208 are connected to the internal bus 206.

The processor 201 is hardware that controls operations of the entire data analysis apparatus 100. The main storage device 204 includes, for example, a semiconductor memory and temporarily retains various programs and control data. The main storage device 204 can retain a data analysis program executed by the processor 201. As the data analysis program is executed by the processor 201, a data analysis process by the data analysis apparatus 100 can be implemented.

The external storage device 205 is a storage device having a large storage capacity and is, for example, a hard disk device or a solid state drive (SSD). The external storage device 205 can retain the manufacturing history data D1 to D3 and the pass/fail data H1 in addition to executable files of various programs. The main storage device 204 and the external storage device 205 can be accessed from the processor 201.

The communication control device 202 is hardware having a function of controlling communication with external devices. The communication control device 202 is connected to a network 209 via the communication interface 203. The network 209 may be the Internet or a local area network (LAN). The input device 207 may include a keyboard, a mouse, and the like for a user of the data analysis apparatus 100 to input for various operations. The output device 208 may include a liquid crystal display or the like for displaying various types of information.

Figure 3A:
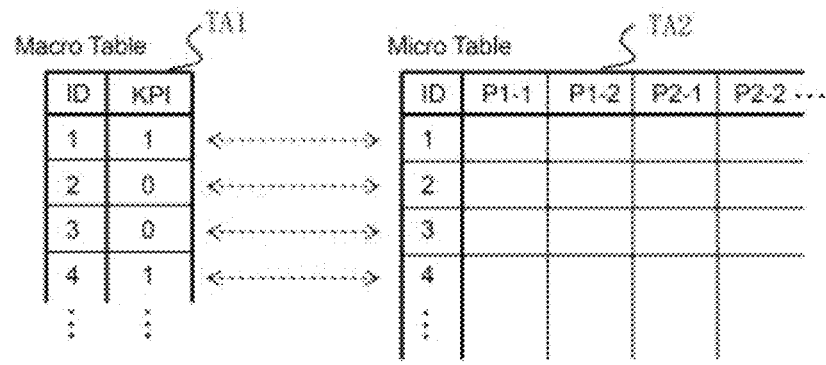
FIG. 3A is a diagram illustrating an 1:1 correspondence relationship between KPIs assigned with unit IDs and parameters of manufacturing history data.
Figure 3B:
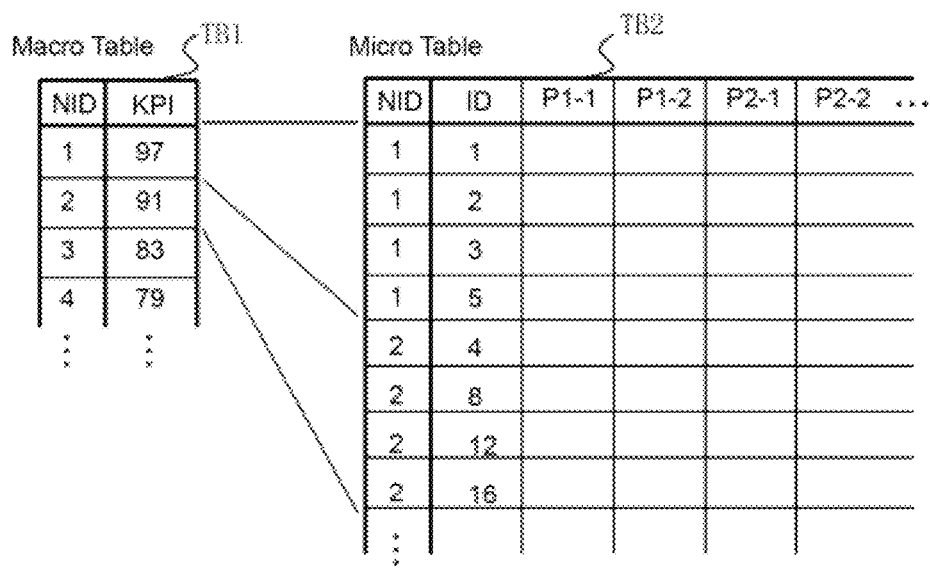
FIG. 3B is a diagram illustrating an 1:N correspondence relationship between KPIs of groups of unit IDs and the parameters of the manufacturing history data.

FIG. 3A is a diagram illustrating an 1:1 correspondence relationship between KPIs assigned to unit IDs and parameters of manufacturing history data, and FIG. 3B is a diagram illustrating an 1:N correspondence relationship between KPIs of groups of unit IDs and the parameters of the manufacturing history data.

In FIG. 3A, data TA1 in which binary first KPIs indicating whether units are good products or defective products by 1 or 0 and unit IDs correspond to each other by 1:1 can be obtained from the data collecting device 109. Also, data TA2 in which various parameters P1-1, P1-2, P2-1, P2-2, and so on of units used as explanatory variables and the unit IDs correspond to each other by 1:1 can be obtained from the data collecting device 109. Parameters P1-1 and P1-2 can be obtained from manufacturing history data D1, and parameters P2-1 and P2-2 can be acquired from manufacturing history data D2.

At this time, by combining the data TA1 and TA2 with each other via the unit IDs, the first KPI of each unit can be correspond to the various parameters P1-1, P1-2, P2-1, P2-2, and so on by 1:1.

In FIG. 3B, the data analysis apparatus 100 generates M groups including data regarding a plurality of units from data where the first KPIs of the respective units and the various parameters P1-1, P1-2, P2-1, P2-2, and so on are given by 1:1. Group identification information NID can be given to each group. At this time, based on the first KPIs of the plurality of units, a second KPI can be set to each group. Second KPIs can be selected from N values so as to be different from one group to another.

At this time, the data analysis apparatus 100 can obtain data TB1 in which the second KPIs and the group identification information NID correspond to each other by 1:1. A plurality of unit IDs correspond to the respective types of group identification information NID. To this end, the data analysis apparatus 100 can generate groups including data regarding a plurality of units, thereby obtaining the data TB2 in which the group identification information NID and the various parameters P1-1, P1-2, P2-1, P2-2, and so on regarding the plurality of units correspond to each other by 1:N.

Then, the data analysis apparatus 100 can combine the data TB1 and TB2 with each other via the group identification information NID, thereby associating the second KPIs of each group with the various parameters P1-1, P1-2, P2-1, P2-2, and so on by 1:N. By using the data in which the second KPI of each group and the various parameters P1-1, P1-2, P2-1, P2-2, and so on regarding the plurality of units correspond to each other by 1:N, a correlation analysis between the second KPIs of each group and the feature for each group calculated based on the various parameters P1-1, P1-2, P2-1, P2-2, and so on regarding the plurality of units can be performed. By referring to a result of the correlation analysis, a feature serving as a defect factor of products manufactured in the manufacturing line 11 can be selected.

Figure 4A:
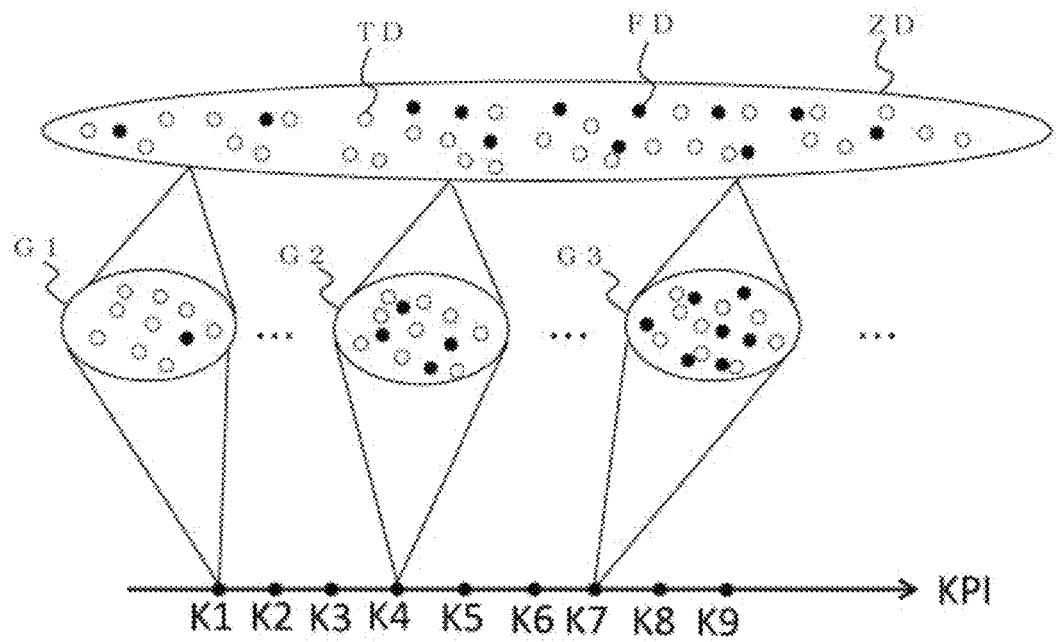
FIG. 4A is a diagram illustrating a method of generating KPIs of N values by grouping units given binary KPIs thereto based on pass/fail determinations.
Figure 4B:
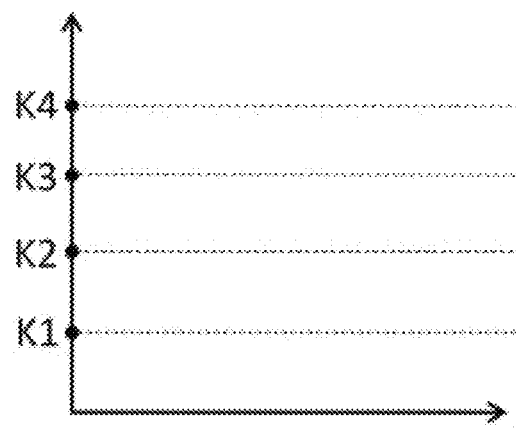
FIG. 4B is a diagram plotting KPIs having N values on the Y axis of the XY coordinate system.
Figure 4C:
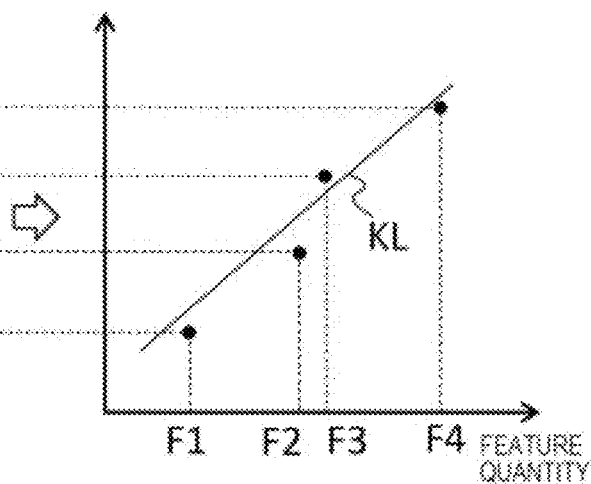
FIG. 4C is a diagram illustrating a method of analyzing a correlation between the KPIs having N values of FIG. 4B and the feature of explanatory variables thereof.

FIG. 4A is a diagram showing a method of generating KPIs of N (N is an integer of 2 or greater) values by grouping units given binary KPIs thereto based on pass/fail determinations, FIG. 4B is a diagram plotting KPIs having N values on the Y axis of the XY coordinate system, and FIG. 4C is a diagram illustrating a method of analyzing a correlation between the KPIs having N values of FIG. 4B and the feature of explanatory variables thereof.

In FIG. 4A, the data analysis apparatus 100 obtains a population ZD of all pass/fail data indicating whether products manufactured in the manufacturing line 11 are good products or defective products. Then, groups G1 to G4 to G7 and soon each including pass/fail data regarding a plurality of units are generated from the population ZD. At this time, pass/fail data can be grouped, such that the ratio of defective product data FD to good product data TD (hereinafter referred to as a defect rate) varies for each of the groups G1, G2, G3, and so on. Then, second KPIs are set according to the respective defect rates of the groups G1 to G4 to G7 and so on. In FIG. 4A, the second KPIs of the respective groups G1 to G9 are denoted by K1 to K9.

Next, as in FIG. 4B, the second KPIs of the respective group G1, G2, G3, G4, and so on are plotted on the Y axis of the XY coordinate system.

Next, as in FIG. 4C, based on the parameters P1-1, P1-2, P2-1, P2-2, and so on regarding the plurality of units belonging to each group, the feature of each group is calculated. The feature of each group may be obtained for each of the Parameters P1-1, P1-2, P2-1, P2-2, and so on or for a combination of a plurality of parameters P1-1, P1-2, P2-1, P2-2, and so on.

Next, correlation analysis is performed between the second KPIs and the feature quantities of the respective group G1, G2, G3, G4, and so on, thereby obtaining a regression line KL. In FIG. 4C, the feature quantities of the groups G1, G2, G3, and G4 are denoted by F1, F2, F3, and F4, respectively. This correlation analysis can be performed for each feature obtained for each of the parameters P1-1, P1-2, P2-1, P2-2, and so on of each of a plurality of units which belong to each of the groups G1, G2, G3, G4, and so on. Alternatively, this correlation analysis may be performed for each feature obtained for a combination of the plurality of parameters P1-1, P1-2, P2-1, P2-2, and so on regarding a plurality of units belonging to each of the groups G1, G2, G3, G4, and so on. At this time, p-values related to a correlation coefficient between the second KPIs and feature quantities of the groups G1, G2, G3, G4, and so on can be obtained. Then, a feature corresponding to a p-value which is less than or equal to a threshold value can be presented as a defect factor.

Figure 5:
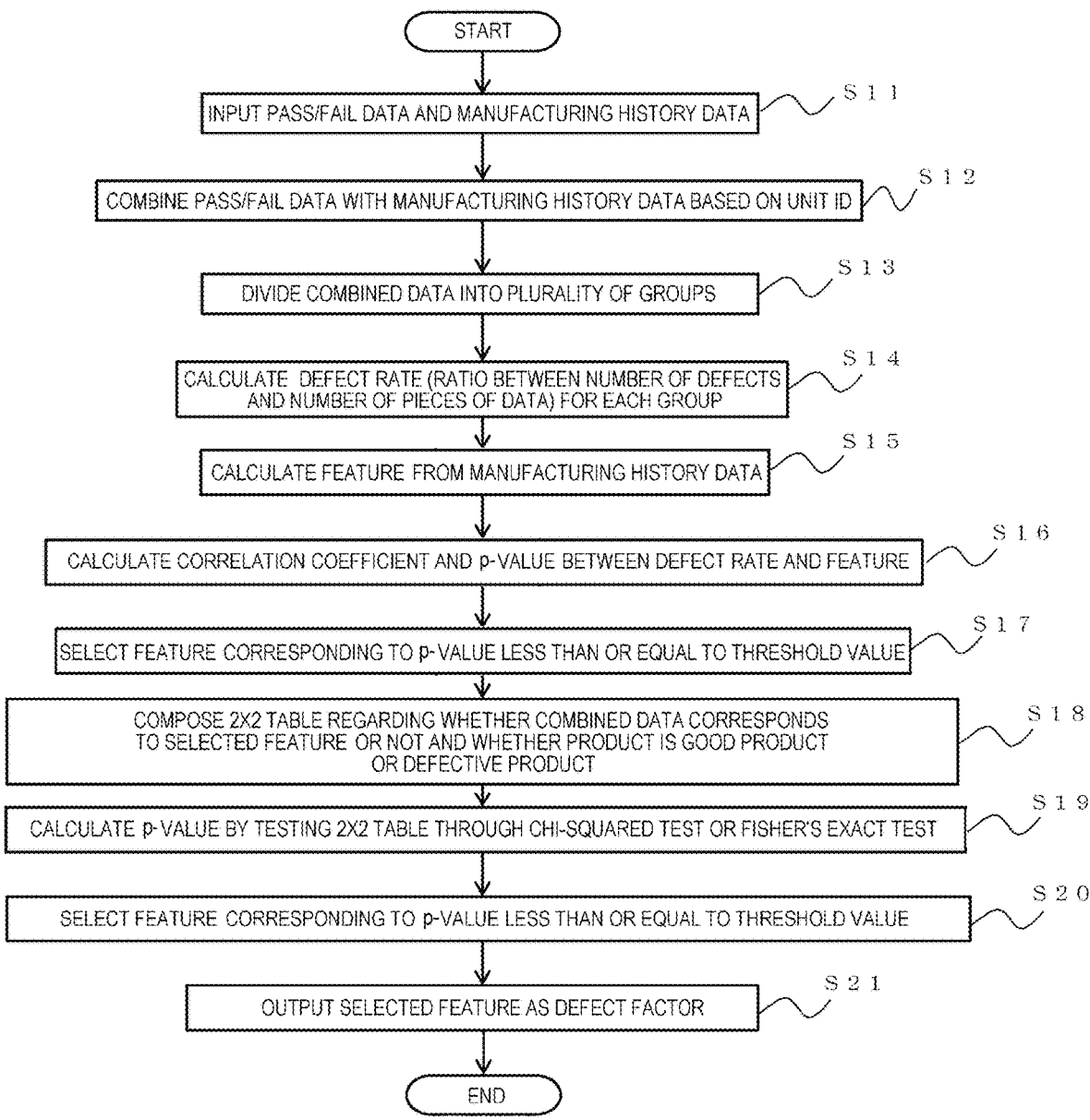
FIG. 5 is a flowchart illustrating a data analysis method according to the first embodiment.

FIG. 5 is a flowchart of a data analysis method according to the first embodiment.

In step S11 of FIG. 5, pass/fail data and manufacturing history data regarding products for which a factory engineer or a worker of a manufacturing site desires to find a defect factor are input to the data analysis apparatus 100. This pass/fail data is the first KPI, which is an important indicator to increase good products and reduce defective products at the manufacturing site.

Here, the pass/fail data and the manufacturing history data regarding products manufactured in the manufacturing line 11 can be collected by the data collecting device 109. Then, it may be configured such that, by designating products for which a factory engineer or a worker of a manufacturing site desires to find a defect factor on the data analysis apparatus 100, pass/fail data and manufacturing history data regarding the products are introduced from the data collecting device 109 to the data analyzing device 100 for each unit ID.

Next, in step S12, the data analysis apparatus 100 combines the pass/fail data and the manufacturing history data with each other based on unit IDs that are given to respective units of the products and recorded in the pass/fail data and the manufacturing history data. At this time, if the products are mass-produced products, the number of pieces of combined data of the pass/fail data and the manufacturing history data is tens of thousands or hundreds of thousands.

Next, in step S13, the data analysis apparatus 100 divides the combined data of the pass/fail data and the manufacturing history data into M groups. At this time, good product data and defective product data can be allocated to the respective groups, such that the defect rates of the groups are different from one another.

Here, an example of a method of allocating good product data and defective product data will be described. Suppose a data set with 10,000 pieces of good product data and 55 pieces of defective product data. If data is divided such that the number of the groups becomes 10 groups after dividing, the good product data is allocated to each group to be the same 1000 pieces. The good product data may be allocated to each group based on a certain rule or randomly.

The defective product data is allocated, such that the numbers of bad data of the respective groups are different from one another. It is possible to allocate the defective product data to respective groups to be different from one another by one, for example, 1 piece for a group G1, 2 pieces for a group G2, and 3 pieces for a group G3. As a result, good product data and defective product data can be allocated to the respective groups with a simple algorithm, such that the defect rates of the respective groups are different from one another, and thus the load for the allocation can be reduced. The defective product data may be allocated to each group based on a certain rule or randomly.

As described above, by allocating data such that the number of good product data becomes almost the same in each group and the number of defective product data becomes different in each group by one, groups with different defect rates can be generated.

The defect rates different from one group to another can be set as the second KPIs. If a feature correlated with the second KPIs can be found, the possibility that the feature affects the defect rate, that is, the feature is a defect factor is high.

Next, in step S14, the defect rate of each group generated in step S13 is calculated. The defect rate is a ratio of the number of pieces of defective data to the number of pieces of good product data for each group. Here, the defect rate may also be a ratio of the number of pieces of defective data to the total number of pieces of data for each group.

Next, in step S15, the feature is calculated for each group from each parameter of the manufacturing history data. For example, the feature may utilize a value such as a minimum value, a maximum value, an average value, a median value, a variance, or a standard deviation of each parameter calculated for each group. In another example, the range of values of each parameter may be divided into a plurality of regions, and the feature may utilize a ratio of the number of pieces of data for one of the region against the number of pieces of data of an entire group.

Next, in step S16, a correlation coefficient and a p-value (significance probability) between the defect rate calculated in step S14 and the feature calculated in step S15 are calculated.

Next, in step S17, a feature corresponding to a p-value calculated in step S16 less than or equal to a threshold value is selected. Typically, the threshold value is 0.05. However, the threshold value may be another value such as 0.1 or 0.01.

Next, in step S18, for all the records of the combined data obtained in step S12, a 2×2 table is created based on whether the combined data corresponds to a feature or not and whether a product is a good product or a defective product.

FIG. 6 is a diagram illustrating a 2×2 table divided based on whether parameters of manufacturing history data correspond to a feature or not and whether a product is a good product or a defective product.

In FIG. 6, in a 2×2 table 700, parameters are classified according to whether the parameters correspond to a feature in the column direction, and products are classified according to whether the products are good products or defective products in the row direction. In the 2×2 table 700, NA denotes the number of good products when a parameter corresponds to the feature, NB denotes the number of good products when a parameter does not correspond to the feature, NC denotes the number of defective products when a parameter corresponds to the feature, and ND denotes the number of defective products when a parameter does not correspond to the feature.

By using this 2×2 table 700, it can be tested how much the feature selected in step S17 contributes as a defect factor.

Next, in step S19 of FIG. 5, the 2×2 table created in step S18 is tested through the Chi-square test or the Fisher's exact probability test (hereinafter referred to as a Fisher's test) and a p-value is calculated. Which of the Chi-square test or the Fisher's test is used can be determined according to the values of NC and ND in FIG. 6. If the values of NC and ND are in the range from 1 to 100, the Fisher's test can be used. In the Fisher's test, as the values of NC and ND increase, the amount of calculation becomes enormous. If the values of NC and ND are about 100 or more, the Chi-square test can be used. In the Chi-square test, if the values of NC and ND are small, test accuracy is deteriorated.

Next, in step S20, a feature having a p-value calculated in step S19 which is less than or equal to a threshold value is selected. Typically, the threshold value is 0.05. However, the threshold value may be another value such as 0.1 or 0.01.

Next, in step S21, the feature selected in step S20 is output as a defect factor. If a plurality of feature quantities are selected, all the feature quantities may be output or only the number of feature quantities designated by a system user may be output.

The processes of steps S12 to S20 can be executed by the control device 102 of FIG. 1. The defect factor output in step S21 can be displayed on the screen of the display device 103 in FIG. 1.

Specific examples of pass/fail data and parameters of manufacturing history data for each unit ID of products will be described below.

FIG. 7 is a diagram illustrating a correspondence relationship between unit IDs and pass/fail determination results used in the data analysis method according to the first embodiment. Furthermore, in FIG. 7, whether a unit is a good product or a defective product is indicated as True or False.

In FIG. 7, at a manufacturing site, data 401 in which the pass/fail determination results, where whether units are good products or defective products is indicated as True or False, correspond to unit IDs by 1:1 can be obtained. The pass/fail determination results can be used as the first KPI.

FIG. 8 is a diagram illustrating a correspondence relationship between unit IDs and manufacturing history data used in the data analysis method according to the first embodiment.

In FIG. 8, at a manufacturing site, data 501 in which various parameters P1-1, P1-2, P2-1, P2-2, P3-1, and P3-2 of units used as explanatory variables correspond to unit IDs by 1:1 can be obtained. Parameters P1-1 and P1-2 can be retrieved from the manufacturing device A, parameters P2-1 and P2-2 can be retrieved from the manufacturing device B, and parameters P3-1 and P3-2 can be retrieved from the manufacturing device C.

The range of values of a parameter P1-1 is from 0.043 to 0.967. In order to calculate the feature of each group, for example, this range of values can be divided into three regions. At this time, regions of the parameter P1-1 include a region of values equal to or greater than 0.043 and less than 0.351, a region of values equal to or greater than 0.351 and less than 0.659, and a region of values equal to or greater than 0.659 and less than or equal to 0.967. Here, the regions may be set to divide values from the maximum value to the minimum value of the range of values of the parameter P1-1 equally into three regions. By taking distribution of data into account, regions may be set by using a 33.3 percentile point and a 66.6 percentile point.

FIG. 9A is a diagram illustrating a correspondence relationship between the unit IDs of a group 1 and manufacturing history data used in the data analysis method according to the first embodiment, and FIG. 9B is a diagram showing a correspondence relationship between the unit IDs of a group 2 and manufacturing history data used in the data analysis method according to the first embodiment. Here, FIG. 9A illustrates an example of calculating a feature when the parameter P1-1 of group 1 is "equal to or greater than 0.351 and less than 0.659", and FIG. 9B illustrates an example of calculating a feature when the parameter P1-1 of group 2 is "equal to or greater than 0.351 and less than 0.659".

In FIGS. 9A and 9B, when it is assumed that the total number of pieces of data of groups 1 and 2 is 9, nine different unit IDs are selected from the data 401 of FIG. 7 for each of the groups 1 and 2, such that the defect rates thereof are different from each other. In the group 1, 4 out of 9 pieces of data are False. In the group 2, 3 out of 9 pieces of data are False. When the groups 1 and 2 are generated such that the defect rates thereof are different from each other, respective feature quantities of the groups 1 and 2 are calculated.

In FIG. 9A, the number of pieces of data satisfying the condition that the parameter P1-1 of the group 1 is "equal to or greater than 0.351 and less than 0.659" is 2, that is, data corresponding to unit IDs 1008 and 2007. Therefore, the feature of the group 1 can be calculated as $2/9=0.22$.

In FIG. 9B, the number of pieces of data satisfying the condition that the parameter P1-1 of the group 2 is "equal to or greater than 0.351 and less than 0.659" is 4, that is, data corresponding to unit IDs 1003, 2001, 2002, and 2003. Therefore, the feature of the group 2 can be calculated as $4/9=0.44$.

The feature may be a feature obtained from a region obtained by dividing the range of values of one parameter as described above. Furthermore, an AND condition may be applied to two parameters. For example, the feature may be a feature obtained from the number of pieces of data included in the region in which while the parameter P1-1 is "equal to or greater than 0.351 and less than 0.659", the parameter P1-2 is "equal to or greater than 0.7 and less than or equal to 0.937". Here, the AND condition including two Parameters is exemplified. However, a feature can be created by combining three or more parameters.

Second Embodiment

Figure 10:
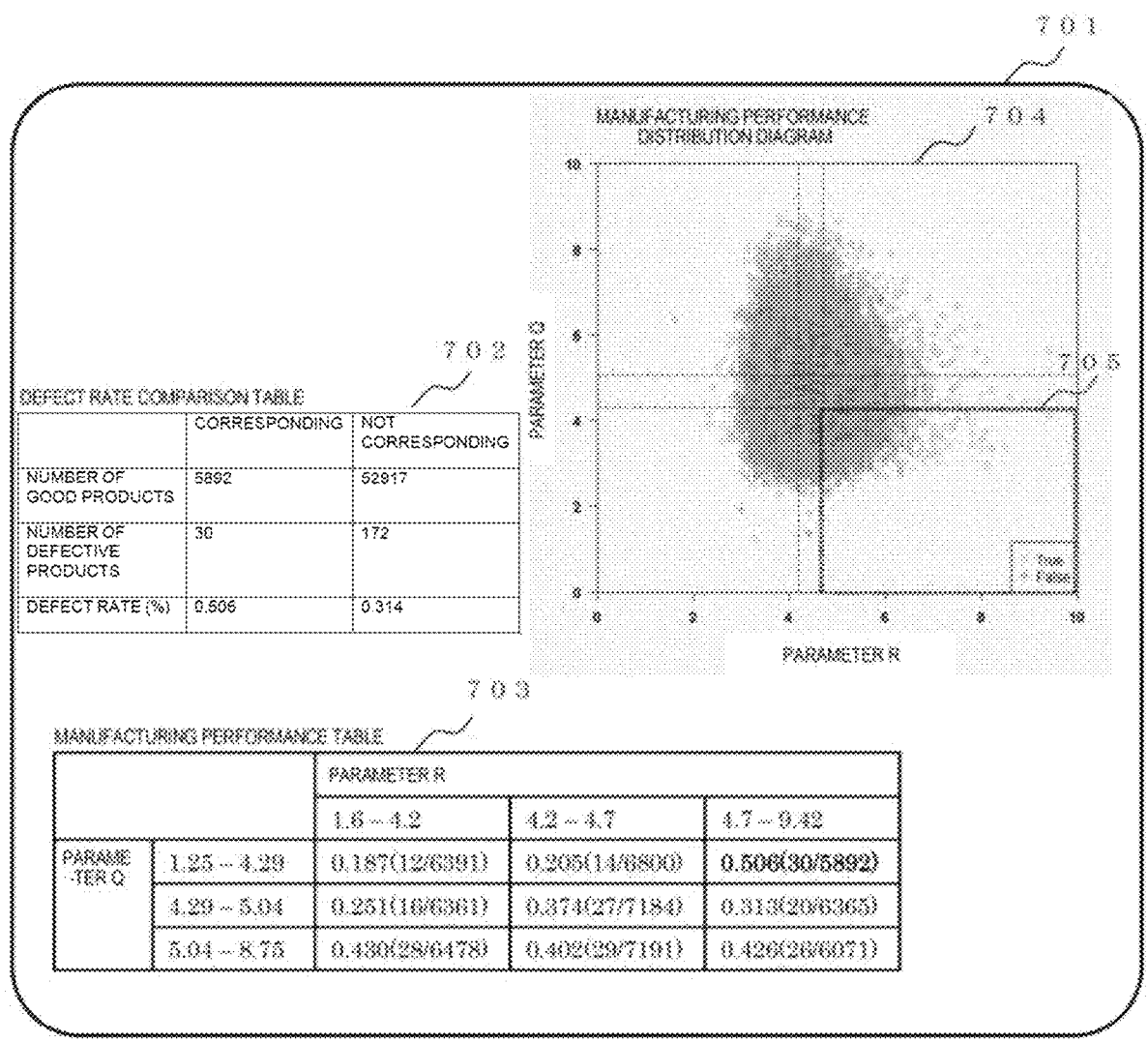
FIG. 10 is a diagram illustrating an example of a screen image in which defect factors identified by a data analysis system according to a second embodiment are displayed.

FIG. 10 is a diagram illustrating an example of a screen image in which defect factors identified by a data analysis system according to the second embodiment are displayed.

In FIG. 10, for example, a defect rate comparison table 702, a manufacturing performance table 703, and a manufacturing performance distribution 704 are displayed in a screen image 701.

The defect rate comparison table 702 illustrates the numbers of pieces of data and defect rates in a case where good products and defective products are categorized based on whether data corresponds to a feature. By referring to the defect rate comparison table 702, a user can recognize that the defect rate of a product corresponding to a feature, that is, a product manufactured under a condition satisfying the feature is 0.506% and the defect rate of a product manufactured under a condition not satisfying the feature is 0.314%. Since the defect rate of the case of being manufactured under the condition satisfying the feature is higher than the defect rate of the case of being manufactured under the condition not satisfying the feature, it can be determined that the manufacturing condition is a defect factor. Since it is clarified in step S20 of FIG. 5 that the feature is a p-value less than or equal to the threshold value, the feature is statistically reliable.

The manufacturing performance table 703 is a table in which manufacturing history data is classified based on the feature quantities created in step S15 of FIG. 5. The manufacturing performance table 703 illustrates the total numbers of products manufactured under AND conditions including parameters Q and R, the numbers of defective products and defect rates. Here, in the example in FIG. 10, the range of values of each of parameter Q and R is divided into 3 regions, and the total numbers of products, the numbers of defective products, and the defect rates are illustrated for 3×3=9 combinations. In the manufacturing performance table 703 of FIG. 10, the feature selected in step S20 of FIG. 5 is expressed in bold. The feature specified in the manufacturing performance table 703 is calculated from the region in which while the parameter Q is "equal to or greater than 1.25 and less than 4.29", the parameter R is "equal to or greater than 4.7 and less than 9.42".

Therefore, by referring to the manufacturing performance table 703, the user can determine that products manufactured in the region in which the parameter Q is "equal to or greater than 1.25 and less than 4.29" and the parameter R is "equal to or greater than 4.7 and less than 9.42" exhibit a high defect rate. Therefore, it can be easily determined that, in order to reduce the defect rate of products, manufacturing conditions need to be changed, such that the condition does not fall in the region in which while the parameter Q is "equal to or greater than 1.25 and less than 4.29", the parameter R is "equal to or greater than 4.7 and less than 9.42".

The manufacturing performance distribution 704 is a scatter plot in which the parameters constituting the feature created in step S15 of FIG. 5 are plotted on the X axis and the Y axis and the positions of good products and defective products are plotted in the corresponding XY coordinate system. In the manufacturing performance distribution 704 of FIG. 10, the positions of good products are indicated by ○ (True) and the positions of defective products are indicated by + (False). The manufacturing performance distribution 704 can display the manufacturing performance table 703 on a 2-dimensional plane, and thus a user can visually and intuitively understand the meaning of the feature. The manufacturing performance distribution 704 of FIG. 10 illustrates that a defect rate of products manufactured under the condition where while the parameter Q is small in the entire distribution, the parameter R is large in the entire distribution is high. At this time, the region in which while the parameter Q is "equal to or greater than 1.25 and less than 4.29", the parameter R is "equal to or greater than 4.7 and less than 9.42" corresponding to the feature specified in the manufacturing performance table 703 may be surrounded by a frame 705. The defect rate comparison table 702, the manufacturing performance table 703, and the manufacturing performance distribution 704 can be displayed for all the feature quantities selected in step S20 of FIG. 5.

In this regard, by displaying the manufacturing performance table 703 or the manufacturing performance distribution 704, even when objective variables collected at a manufacturing site or a factory are represented by discrete values of 1 or 0, it can be easily determined whether an explanatory variable falls within a controllable range, and thus a defect factor can be specified.

The defect rate comparison table 702, the manufacturing performance table 703, and the manufacturing performance distribution 704 may also be created for feature quantities which are not selected in step S20 of FIG. 5, and stored in the storage device 101. Although not selected in step S20 of FIG. 5, there is sometimes a case where a user wants to determine how much a feature interested by the user contributes a defect rate. By displaying the defect rate comparison table 702, the manufacturing performance table 703, and the manufacturing performance distribution 704 for such a feature, it can be confirmed that the feature is not a defect factor.

In FIG. 10, the defect rate comparison table 702, the manufacturing performance table 703, and the manufacturing performance distribution 704 are displayed in the same screen image 701. However, at least any one of the defect rate comparison table 702, the manufacturing performance table 703, and the manufacturing performance distribution 704 may be displayed on the same screen image 701. For example, tabs displaying texts "defect rate comparison table", "manufacturing performance table", and "manufacturing performance distribution" may be displayed on the screen image 701, and the defect rate comparison table 702, the manufacturing performance table 703, or the manufacturing performance distribution 704 can be displayed by clicking one of those tabs.

What is claimed is:

1. A data analysis system comprising:
   a plurality of different manufacturing devices to manufacture a plurality of products;
   a plurality of sensors coupled to each of the plurality of different manufacturing devices to detect each of a plurality of different operation states of each of the manufacturing devices while manufacturing the plurality of products, wherein the plurality of different operation states include at least one of:
      a flow rate of a gas or liquid, position data of a machine tool while positioning, pressure data while performing a pressing operation, or temperature data while heating or cooling;
   a data collecting device, which is commutatively coupled to the plurality of sensors during the manufacture of each product, configured to collect manufacturing history data for each of the plurality of products based on the detected different operation states across the different manufacturing devices, wherein
      each of the plurality of products is individually identified by identification information;
      binary first key performance indicators (KPIs) indicate whether each of the plurality of products are good or defective;
      K explanatory variables (K is an integer of 2 or greater) correspond to the collected manufacturing history data for each of the plurality of products; and
      the first KPIs and the K explanatory variables are given by a 1:1 correspondence; and
   a data analysis apparatus configured to:
      group the plurality of products into M (M is an integer of 3 or greater) groups of products such that a number of defective products in each of the M groups is different;
      generate second KPIs indicating a defect rate for each of the M groups based on the first KPIs of each product;
      perform a correlation analysis between the second KPIs of each of the M groups and K explanatory variables to generate a plurality of significance probability values; and
      select a feature from the K explanatory variables as a defect factor of the plurality of products based on comparing a selected significance probability value of the plurality of significance probability values with a threshold.

2. The data analysis system according to claim 1, wherein the second KPIs of the respective groups are different from one another.

3. The data analysis system according to claim 1, wherein the second KPIs for each of the M groups and the K explanatory variables are given by a 1:N correspondence (N is an integer of 2 or greater).

4. The data analysis system according to claim 1, wherein a range of values of the K explanatory variables is divided into P (P is an integer of 2 or greater) regions, and a ratio of a number of pieces of data included in one of the regions to the number of pieces of data of the group is obtained as the feature.

5. The data analysis system according to claim 1, wherein the feature is selected based on a correlation analysis between the second KPI of each group and a second feature of each group set based on a combination of two explanatory variables.

6. The data analysis system according to claim 1, wherein the feature is selected based on a test result expressed as a 2×2 table divided based on a number of good products and the number of defective products, and the selected feature is presented as the defect factor of the product.

7. The data analysis system according to claim 6, wherein the 2×2 table is tested based on a Chi-square test or a Fisher's exact test.

8. The data analysis system according to claim 1, wherein the data analysis apparatus includes a display device configured to display at least one of:
   a defect rate comparison table in which defect rates are indicated depending on whether to correspond to the defect factor,
   a manufacturing performance table in which defect rates for respective regions of parameters of the defect factor are indicated, or a manufacturing performance distribution in which values of two parameters of the defect factor are plotted in an XY coordinate system.

9. A data analysis apparatus comprising:
a communication device;
a data collecting device coupled to the communication device;
a plurality of sensors coupled to the data collecting device and coupled to each of a plurality of manufacturing devices to collect manufacturing history data for each of a plurality of products based on detecting a plurality of different operation states of the manufacturing devices while manufacturing each of the plurality of products, wherein the plurality of different operation states include at least one of:
a flow rate of a gas or liquid, position data of a machine tool while positioning, pressure data while performing a pressing operation, or temperature data while heating or cooling; and
a processor configured to
group the plurality of products into M (M is an integer of 3 or greater) groups of products such that a number of defective products in each of the M groups is different, wherein
binary first objective variables indicate whether each of the plurality of products are good or defective;
K explanatory variables (K is an integer of 2 or greater) correspond to the collected manufacturing history data for each of the plurality of products; and
the first objective variables and the K explanatory variables are given by 1:1; and
generate second objective variables indicating a defect rate for each of the M groups based on the first objective variables of each product;
perform a correlation analysis between the second objective variables of each of the M groups and the K explanatory variables to generate a plurality of significance probability values; and
select a feature from the K explanatory variables as a defect factor of the plurality of products based on comparing a selected significance value of the plurality of the significance probability values with a threshold.

10. The data analysis apparatus according to claim 9, wherein the second objective variables of the respective groups are different from one another.

11. The data analysis apparatus according to claim 9, wherein
the second objective variable for each of the M groups and the K explanatory variables are given by a 1:N correspondence (N is an integer of 2 or greater).

12. The data analysis apparatus according to claim 9, wherein
a range of values of the K explanatory variables is divided into P (P is an integer of 2 or greater) regions, and
a ratio of the number of pieces of data included in one of the regions to a number of pieces of data of the group is obtained as the feature.

13. The data analysis apparatus according to claim 9, wherein
the feature is selected based on a p-value related to a correlation coefficient between the defect rate and the feature, and
the selected feature is presented as the defect factor of the product.

14. The data analysis apparatus according to claim 13, wherein
the feature is selected based on a test result expressed as a 2×2 table divided based on the number of good products and the number of defective products, and
the selected feature is presented as the defect factor of the product.

* * * * *